(12) United States Patent
Shimozono et al.

(10) Patent No.: US 11,808,499 B2
(45) Date of Patent: Nov. 7, 2023

(54) METHOD FOR REPLACING REFRIGERANT IN REFRIGERATION APPARATUS, REFRIGERATING MACHINE OIL, AND CONTAINER

(71) Applicant: DAIKIN INDUSTRIES, LTD., Osaka (JP)

(72) Inventors: Naoki Shimozono, Osaka (JP); Tomomi Yokoyama, Osaka (JP); Ryuuji Takeuchi, Osaka (JP); Masaru Tanaka, Osaka (JP)

(73) Assignee: Daikin Industries, Ltd., Osaka (JP)

( * ) Notice: Subject to any disclaimer, the term of this patent is extended or adjusted under 35 U.S.C. 154(b) by 0 days.

(21) Appl. No.: 17/858,556

(22) Filed: Jul. 6, 2022

(65) Prior Publication Data

US 2022/0341640 A1    Oct. 27, 2022

Related U.S. Application Data

(63) Continuation of application No. PCT/JP2020/048887, filed on Dec. 25, 2020.

(30) Foreign Application Priority Data

Jan. 31, 2020 (JP) ................... 2020-015345
Jun. 5, 2020 (JP) .................... 2020-098476

(51) Int. Cl.
   *F25B 45/00*    (2006.01)
   *F25B 31/00*    (2006.01)
(52) U.S. Cl.
   CPC ............ *F25B 45/00* (2013.01); *F25B 31/002* (2013.01); *F25B 2345/001* (2013.01);
   (Continued)

(58) Field of Classification Search
   CPC .............. F25B 31/002; F25B 2345/001; F25B 2345/002; F25B 245/003; F25B 2500/16
   (Continued)

(56) References Cited

U.S. PATENT DOCUMENTS 8,603,354 B2 * 12/2013 Kaneko ................. C09K 5/045
                                                           62/84
9,243,829 B1 * 1/2016 Parnell .................... F25D 27/00
   (Continued)

FOREIGN PATENT DOCUMENTS

JP    2002-277113 A    9/2002
JP    2002-277114 A    9/2002
   (Continued)

OTHER PUBLICATIONS

International Search Report for PCT/JP2020/048887 dated Feb. 2, 2021.
   (Continued)

*Primary Examiner* — Jerry-Daryl Fletcher
*Assistant Examiner* — Daniel C Comings
(74) *Attorney, Agent, or Firm* — Birch, Stewart, Kolasch & Birch, LLP

(57) ABSTRACT

A refrigerant replacement method for a refrigeration apparatus is intended to replace a first refrigerant charged into a refrigerant circuit of the refrigeration apparatus with a second refrigerant. The second refrigerant is used together with a refrigerating machine oil having a higher additive content by percentage than another refrigerating machine oil to be used together with the first refrigerant. The method includes: a refrigerant recovery step of recovering the first refrigerant from the refrigerant circuit; an oil charging step of additionally charging a refrigerating machine oil having a predetermined additive content by percentage into the refrigerant circuit; and a refrigerant charging step of charg-
   (Continued)

ing the second refrigerant into the refrigerant circuit. The predetermined additive content by percentage is higher than the additive content by percentage of the refrigerating machine oil to be used together with the second refrigerant.

9 Claims, 6 Drawing Sheets

(52) U.S. Cl.
CPC ... *F25B 2345/002* (2013.01); *F25B 2345/003* (2013.01); *F25B 2500/16* (2013.01)

(58) Field of Classification Search
USPC .......................................................... 62/114
See application file for complete search history.

(56) References Cited

U.S. PATENT DOCUMENTS

| 10,077,388 | B2 | 9/2018 | Van Horn et al. |
| 2002/0124578 | A1 | 9/2002 | Ferris et al. |
| 2008/0053144 | A1 | 3/2008 | Mizutani et al. |
| 2013/0025299 | A1 | 1/2013 | Kontomaris et al. |
| 2017/0045277 | A1* | 2/2017 | McMasters ............. F25B 45/00 |
| 2017/0211860 | A1 | 7/2017 | Appler et al. |
| 2021/0246348 | A1 | 8/2021 | Itano et al. |

FOREIGN PATENT DOCUMENTS

| JP | 2003-42603 A | 2/2003 |
| JP | 2013-527273 A | 6/2013 |
| JP | 2019-214720 A | 12/2019 |
| WO | WO 2006/118140 A1 | 11/2006 |
| WO | WO 2017/145278 A1 | 8/2017 |

OTHER PUBLICATIONS

Written Opinion of the International Searching Authority for PCT/JP2020/048887 (PCT/ISA/237) dated Feb. 2, 2021.
International Preliminary Report on Patentability and English translation of the Written Opinion of the International Searching Authority for International Application No. PCT/JP2020/048887, dated Aug. 11, 2022.
Dixon et al., "R1234YF Lubricants", R1234YF Lubricant Selection—Shrieve Chemical, pp. 1-12 (2017).
Extended European Search Report for EP Application No. 20917260.0 dated May 25, 2023.

* cited by examiner

FIG.6A

| ASHRAE Number | COMPOSITION | COMPOSITION RATIO (% BY MASS) |
|---|---|---|
| — | R32/R125/R1234yf | (15/25/60) |
| R513B | R1234yf/R134a | (58.5/41.5) |
| R1234yf | R1234yf | (100) |
| R463A | R744/R32/R125/R1234yf/R134a | (6.0/36.0/30.0/14.0/14.0) |
| R452B | R32/R125/R1234yf | (67/7/26) |
| — | R32/R1234yf | (72.5/27.5) |
| R454B | R32/R1234yf | (68.9/31.1) |
| R449A | R32/R125/R1234yf/R134a | (24.3/24.7/25.3/25.7) |
| R452A | R32/R125/R1234yf | (11.0/59.0/30.0) |
| R454A | R32/R1234yf | (35/65) |
| R449C | R32/R125/R1234yf/R134a | (20/20/31/29) |
| R454C | R32/R1234yf | (21.5/78.5) |
| R513A | R1234yf/R134a | (56/44) |
| R1336mzz(Z) | R1336mzz(Z) | (100) |
| R1336mzz(E) | R1336mzz(E) | (100) |
| R514A | R1336mzz(Z)/R1130(E) | (74.7/25.3) |
| — | R32/R125/R1234ze(E) | (68/15/17) |
| R447B | R32/R125/R1234ze(E) | (68/8/24) |
| R447A | R32/R125/R1234ze(E) | (68/3.5/28.5) |
| — | R32/R1234yf/R1234ze(E) | (73/15/12) |
| — | R32/R1234ze(E) | (72/27) |
| R446A | R32/R1234ze(E)/Butane | (68/29/3) |
| R448A | R32/R125/R1234yf/R134a/R1234ze(E) | (26/26/20/21/7) |
| — | R32/R125/R1234yf/R134a/R1234ze(E) | (25/25/9/21/20) |
| — | R32/R125/R1234yf/R134a | (25/25/30/20) |
| — | R32/R1234yf/R152a/R1234ze(E) | (40/20/10/30) |
| R455A | R744/R32/R1234yf | (3.0/21.5/75.5) |
| — | R32/R125/R134a/R1234yf | (13/13/31/43) |
| — | R32/R125/R1234yf/R134a/R1234ze(E) | (12.5/12.5/13.5/31.5/30) |
| — | R32/R152a/R1234ze(E) | (45/20/35) |

FIG.6B

| ASHRAE Number | COMPOSITION | COMPOSITION RATIO (% BY MASS) |
|---|---|---|
| R444B | R32/R152a/R1234ze(E) | (41.5/10/48.5) |
| — | R1234yf/R134a/R1234ze(E) | (18/42/40) |
| R450A | R134a/R1234ze(E) | (42/58) |
| R515A | R1234ze(E)/R227ea | (88/12) |
| R515B | R1234ze(E)/R227ea | (91.1/8.9) |
| R1234ze(E) | R1234ze(E) | (100) |
| R1233zd(E) | R1233zd(E) | (100) |
| — | R32/R125/CF3I | (49.0/11.5/39.5) |
| — | R32/R1234yf/R134a | (50/40/10) |
| R459A | R32/R1234yf/R1234ze(E) | (68/26/6) |
| R452C | R32/R125/R1234yf | (12.5/61/26.5) |
| R449B | R32/R125/R1234yf/R134a | (25.2/24.3/23.2/27.3) |
| — | R32/R1234yf/R134a | (28/51/21) |
| — | R32/R1234yf/R152a | (35/55/10) |
| — | R32/R1234yf | (29/71) |
| R465A | R32/R290/R1234yf | (21.0/7.9/71.1) |
| R457A | R32/R1234yf/R152a | (18/70/12) |
| — | R32/R125/R1234yf/R134a | (25/30/20/25) |
| — | R32/R1234yf/R134a | (6/31/63) |
| — | R1234yf/R134a/R152a | (82/7/11) |
| R516A | R1234yf/R134a/R152a | (77.5/8.5/14.0) |
| — | R1123/R32 | (32/68) |
| — | R1123/R32 | (40/60) |
| — | R1123/R32 | (45/55) |
| — | R1123/R32/R1234yf | (19/55/26) |
| — | R1123/R32/R1234yf | (40/44/16) |
| — | R1123 | (100) |

FIG.6C

| ASHRAE Number | COMPOSITION | COMPOSITION RATIO (% BY MASS) |
|---|---|---|
| R1224yd(Z) | R1224yd(Z) | (100) |
| — | R744/R32/R1234ze(E) | (6/60/34) |
| — | R32/R134a/R1234ze | (76/6/18) |
| R460A | R32/R125/R134a/R1234ze(E) | (12/52/14/22) |
| R459B | R32/R1234yf/R1234ze(E) | (21/69/10) |
| R460B | R32/R125/R134a/R1234ze(E) | (28/25/20/27) |
| — | R744/R32/R1234ze(E) | (7/30/63) |
| R456A | R32/R134a/R1234ze(E) | (6/45/49) |
| R445A | R744/R134a/R1234ze(E) | (6.0/9.0/85.0) |
| R444A | R32/R152a/R1234ze(E) | (12/5/83) |
| R1132a | R1132a | (100) |
| — | R1132(E)/R1123 | (65/35) |
| — | R1132(E)/R1123/R1234yf | (70/20/10) |
| — | R1132(E)/R1123/R1234yf/R32 | (60/5.7/20/14.3) |
| — | R1132(E)/R1234yf/R32 | (50/35.7/14.3) |
| — | R1132(E)/R1234yf/R32/CO2 | (35.7/47/14.3/3) |
| — | R1132(E)/R1123/R32 | (30/55.7/14.3) |

METHOD FOR REPLACING REFRIGERANT IN REFRIGERATION APPARATUS, REFRIGERATING MACHINE OIL, AND CONTAINER

CROSS REFERENCE TO RELATED APPLICATIONS

This application is a Continuation of PCT International Application No. PCT/JP2020/048887, filed on Dec. 25, 2020, which claims priority under 35 U.S.C. 119(a) to Patent Application Nos. 2020-015345, filed in Japan on Jan. 31, 2020 and 2020-098476, filed in Japan on Jun. 5, 2020, all of which are hereby expressly incorporated by reference into the present application.

TECHNICAL FIELD

The present disclosure relates to a refrigerant replacement method for a refrigeration apparatus, a refrigerating machine oil, and a container.

BACKGROUND ART

A refrigerant replacement method that has been known in the art is intended to replace a first refrigerant previously charged into a refrigerant circuit of a refrigeration apparatus with a second refrigerant different from the first refrigerant. For example, Patent Document 1 shows that examples of the refrigerant replacement method of this type include so-called "retrofitting." This retrofitting is mainly performed by the following procedure. In this procedure, a first refrigerant is recovered from a refrigerant circuit, and a compressor is detached from the refrigerant circuit. Subsequently, a refrigerating machine oil inside the compressor is replaced with another refrigerating machine oil suitable for a second refrigerant, and then the compressor is attached to the refrigerant circuit. Thereafter, the second refrigerant is charged into the refrigerant circuit.

CITATION LIST

Patent Document

Patent Document 1: Japanese Unexamined Patent Publication No. 2019-214720

SUMMARY

A first aspect of the present disclosure is directed to a refrigerant replacement method for a refrigeration apparatus. The method is intended to replace a first refrigerant charged into a refrigerant circuit (10) of the refrigeration apparatus with a second refrigerant. The second refrigerant is used together with a refrigerating machine oil having a higher additive content by percentage than another refrigerating machine oil to be used together with the first refrigerant. The refrigerant replacement method for the refrigeration apparatus includes: a refrigerant recovery step of recovering the first refrigerant from the refrigerant circuit (10); an oil charging step of additionally charging a refrigerating machine oil having a predetermined additive content by percentage into the refrigerant circuit (10); and a refrigerant charging step of charging the second refrigerant into the refrigerant circuit (10). The predetermined additive content by percentage of the refrigerating machine oil charged into the refrigerant circuit (10) in the oil charging step is higher than the additive content by percentage of the refrigerating machine oil to be used together with the second refrigerant.

BRIEF DESCRIPTION OF THE DRAWINGS

FIG. 6A is a list of hydrofluoroolefin (HFO) refrigerants corresponding to a second refrigerant.

FIG. 6B is a list of other HFO refrigerants corresponding to the second refrigerant.

FIG. 6C is a list of still other HFO refrigerants corresponding to the second refrigerant.

DESCRIPTION OF EMBODIMENTS

An embodiment will be described. A refrigerant replacement method for a refrigeration apparatus according to this embodiment is applicable to various types of refrigeration apparatuses, in particular, a refrigeration apparatus for a marine container. The configuration of a refrigerant circuit (10) of the refrigeration apparatus will now be briefly described, and the refrigerant replacement method for the refrigeration apparatus will be subsequently described in detail.

—Refrigerant Circuit of Refrigeration Apparatus—

Figure 1:
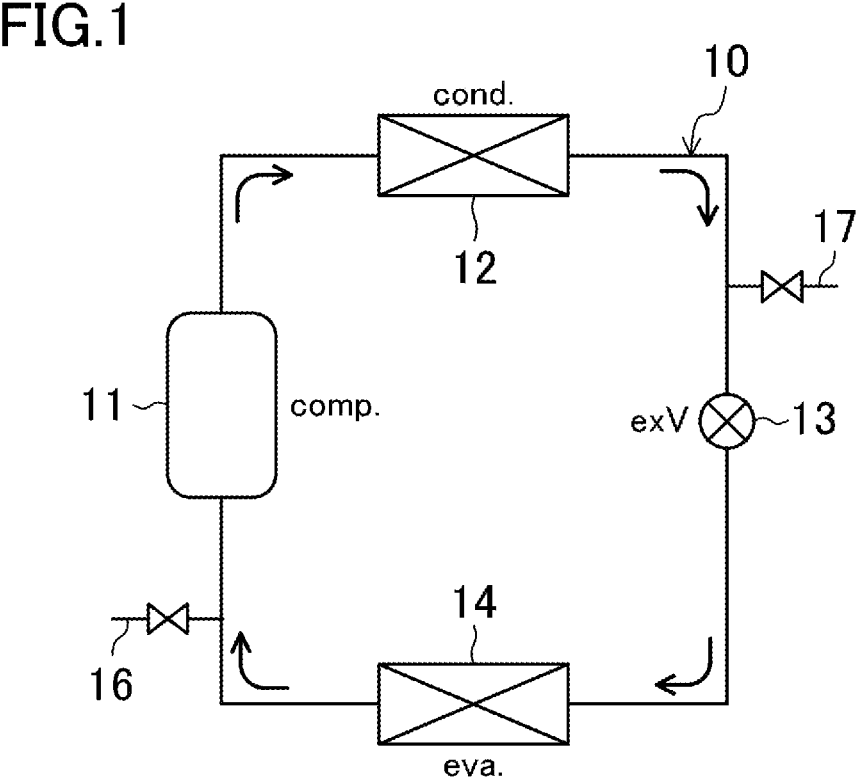
FIG. 1 illustrates a refrigerant circuit of a refrigeration apparatus according to an embodiment.

As illustrated in FIG. 1, the refrigerant circuit (10) of the refrigeration apparatus is a closed circuit in which a compressor (11), a condenser (12), an expansion valve (13), and an evaporator (14) are connected together by piping. The compressor (11) has its suction pipe connected to one end of the evaporator (14), and has its discharge pipe connected to one end of the condenser (12). The expansion valve (13) is disposed between the other end of the condenser (12) and the other end of the evaporator (14).

The refrigerant circuit (10) has a low pressure service port (16) and a high pressure service port (17). The low pressure service port (16) is provided in a pipe connecting the compressor (11) and the one end of the evaporator (14) together. The high pressure service port (17) is provided in a pipe connecting the other end of the condenser (12) and the expansion valve (13) together. During a normal operation of the refrigeration apparatus, the low pressure service port (16) and the high pressure service port (17) are maintained in a closed state.

Actuating the compressor (11) allows a refrigerant to circulate through the refrigerant circuit (10). In this manner, a vapor compression refrigeration cycle is performed. A first fan (not shown) configured to send air to the condenser (12) is disposed near the condenser (12). A second fan (not shown) configured to send air to the evaporator (14) is disposed near the evaporator (14).

Before and after the refrigerant replacement method of this embodiment is performed, a refrigerating machine oil for lubricating the compressor (11) and other components is charged into the refrigerant circuit (10). The refrigerating machine oil contains base oil (such as ether oil), and additives contained in the base oil. Examples of the additives include an antioxidant, an extreme-pressure additive, an acid scavenger, and an oxygen scavenger.

In this specification, the ratio of the total amount of all the additives contained in the refrigerating machine oil to the amount of the refrigerating machine oil is referred to as the "additive content by percentage" (unit: % by weight (wt %)). For example, if 100 grams of the refrigerating machine oil contains four additives in a total amount of 5 grams, the additive content by percentage is 5 wt %. Here, the ratio of the amount of each of the additives to the total amount of all the additives is set as appropriate in accordance with the compositions of the refrigerant and refrigerating machine oil and the intended purpose of the refrigeration apparatus.

Before the refrigerant replacement method of this embodiment is performed, an HFC refrigerant is charged into the refrigerant circuit (10). HFC is an abbreviation for hydrofluorocarbon. An exemplary HFC refrigerant is a refrigerant R134a. The HFC refrigerant corresponds to a first refrigerant. Examples of the HFC refrigerant corresponding to the first refrigerant include, in addition to the refrigerant R134a, refrigerants R23, R32, R143a, R152a, R245fa, R404A, R407C, R407E, R410A, and R507A.

In contrast, after the refrigerant replacement method of this embodiment is performed, a refrigerant containing HFO (such as an HFO refrigerant or a refrigerant containing HFO and HFC) is charged into the refrigerant circuit (10). HFO is an abbreviation for hydrofluoroolefin. An exemplary HFO refrigerant is a refrigerant R513A. The refrigerant containing HFO corresponds to a second refrigerant.

The HFO refrigerant has the property of being more easily decomposed by heat or oxygen than the HFC refrigerant. For this reason, the refrigerant containing HFO needs to be used together with a refrigerating machine oil having a higher additive content by percentage than another refrigerating machine oil to be used together with the HFC refrigerant. This is because the additives are consumed to reduce the amount of oxygen or active species produced by the decomposition of the HFO refrigerant or to neutralize oxygen or active species produced by the decomposition of the HFO refrigerant. Thus, the refrigerating machine oil that needs to be charged into the refrigerant circuit (10) together with the refrigerant containing HFO has a higher additive content by percentage than the refrigerating machine oil that needs to be charged into the refrigerant circuit (10) together with the HFC refrigerant does.

As described above, the additive content by percentage of the refrigerating machine oil to be used together with the refrigerant containing HFO is higher than that of the refrigerating machine oil to be used together with the HFC refrigerant. Here, the "additive content by percentage of the refrigerating machine oil to be used together with the refrigerant" refers to an appropriate value of the additive content by percentage of the refrigerating machine oil to be charged into the refrigerant circuit (10) together with the refrigerant to be charged into the refrigerant circuit (10). Such an appropriate value may be determined, for example, based on experiments or calculations or based on empirical rules.

—Refrigerant Replacement Method—

Figure 2:
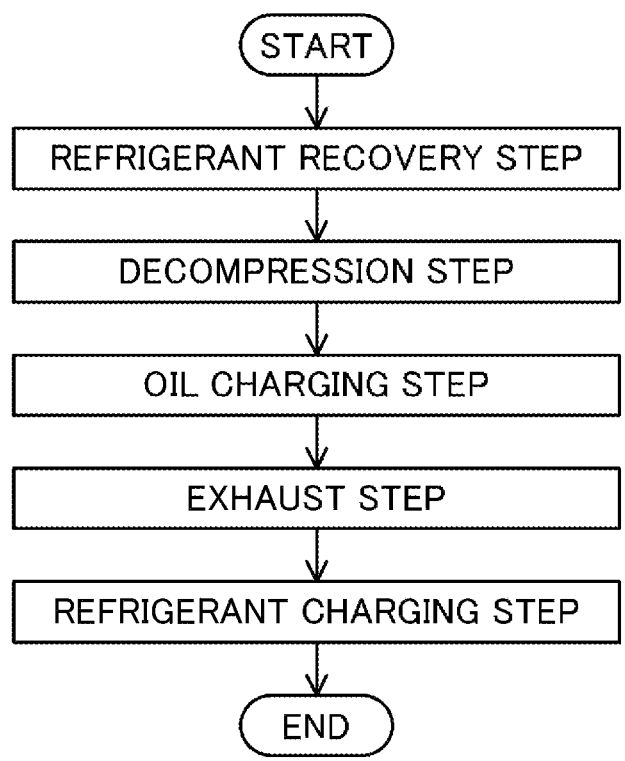
FIG. 2 is a flowchart for explaining a refrigerant replacement method according to the embodiment.

The refrigerant replacement method for the refrigeration apparatus according to this embodiment is intended to replace an HFC refrigerant charged into the refrigerant circuit (10) with a refrigerant containing HFO. As shown in FIG. 2, in the refrigerant replacement method for the refrigeration apparatus, a refrigerant recovery step, a decompression step, an oil charging step, an exhaust step, and a refrigerant charging step are performed in this order.

<Refrigerant Recovery Step>

In the refrigerant recovery step, the HFC refrigerant is recovered from the refrigerant circuit (10) of the refrigeration apparatus. The refrigerant recovery step is performed according to a known mode.

Specifically, in the refrigerant recovery step, an operator initially connects a refrigerant recovery machine to either or both of the low pressure service port (16) and the high pressure service port (17). Next, the operator opens the service port(s) (16, 17) connected to the refrigerant recovery machine, and starts the refrigerant recovery machine. Then, the refrigerant in the refrigerant circuit (10) is sucked out into the refrigerant recovery machine through the service port(s) (16, 17). When the internal pressure of the refrigerant circuit (10) decreases to a predetermined value, the refrigerant recovery machine stops. Thereafter, the operator opens the service port(s) (16, 17) connected to the refrigerant recovery machine, and terminates the refrigerant recovery step.

<Decompression Step>

At the point in time when the refrigerant recovery step ends, the internal pressure of the refrigerant circuit (10) usually remains higher than the atmospheric pressure. In the decompression step, the refrigerant is further discharged from the refrigerant circuit (10) to allow the internal pressure of the refrigerant circuit (10) to be lower than the atmospheric pressure.

Figure 3:
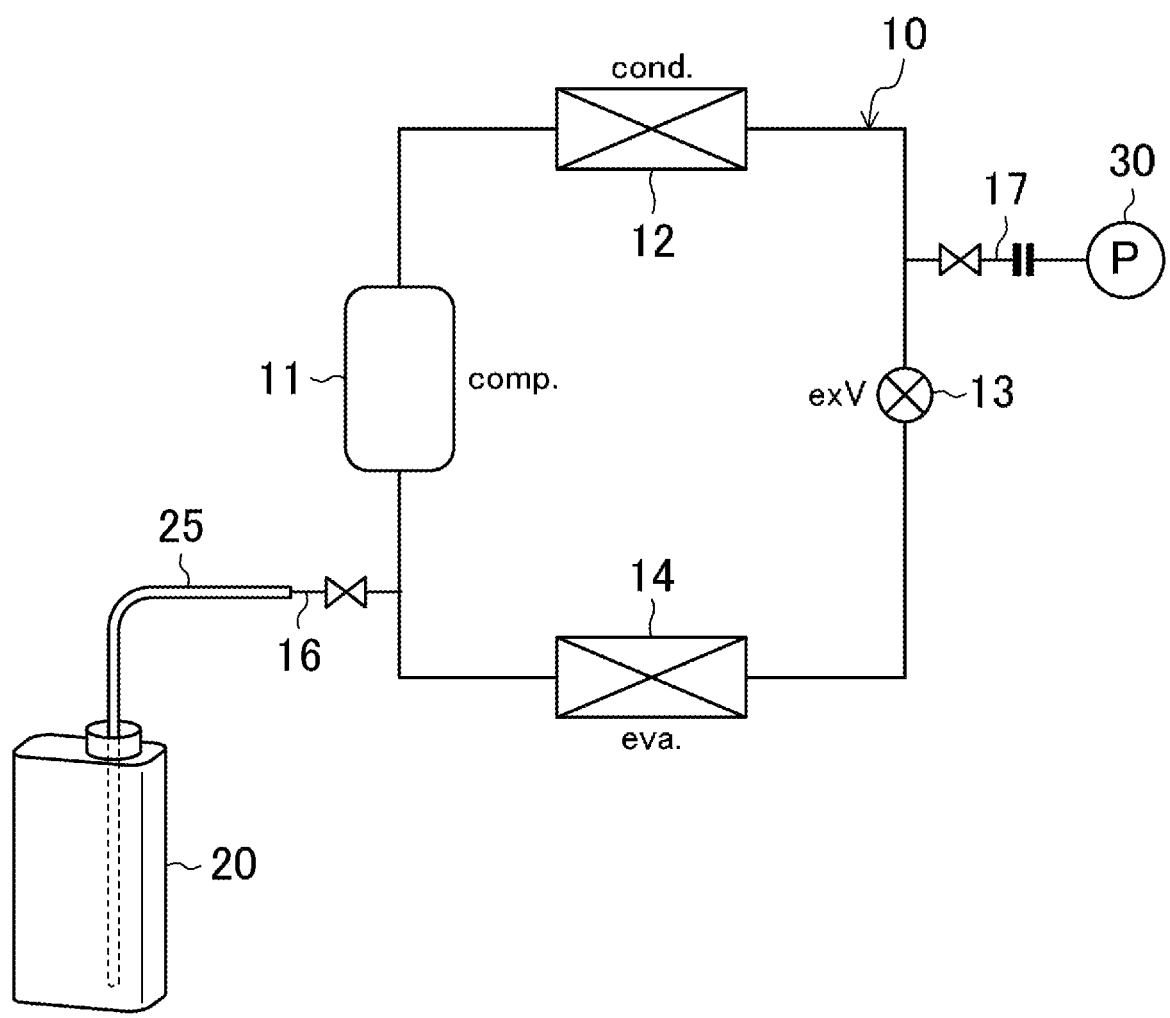
FIG. 3 illustrates the refrigerant circuit of the refrigeration apparatus during the performance of the refrigerant replacement method according to the embodiment.

As illustrated in FIG. 3, in the decompression step, the operator initially connects a vacuum pump (30) to the high pressure service port (17). Next, the operator opens the high pressure service port (17), and starts the vacuum pump (30). If the vacuum pump (30) discharges the refrigerant from the refrigerant circuit (10), the internal pressure of the refrigerant circuit (10) decreases. For example, if the operating time of the vacuum pump (30) reaches a predetermined time (for example, one hour), and the internal pressure of the refrigerant circuit (10) is sufficiently lower than the atmospheric pressure, the operator closes the high pressure service port (17), stops the vacuum pump (30), and terminates the decompression step.

<Oil Charging Step>

In the oil charging step, a supplementary refrigerating machine oil is additionally charged into the refrigerant circuit (10) from which the HFC refrigerant (the first refrigerant) has finished being discharged in the refrigerant recovery step. The oil charging step is performed after the termination of the decompression step. During the performance of the oil charging step, the vacuum pump (30) is kept at rest.

The supplementary refrigerating machine oil is a mixture of base oil and additives, just like the refrigerating machine oil charged into the compressor (11) before the performance of the refrigerant replacement method of this embodiment. The base oil that forms part of the supplementary refrigerating machine oil is the same as the base oil that forms part of the refrigerating machine oil charged into the compressor (11) before the performance of the refrigerant replacement method. The supplementary refrigerating machine oil has a higher additive content by percentage than the refrigerating machine oil to be used together with the refrigerant containing HFO does.

Figure 4:
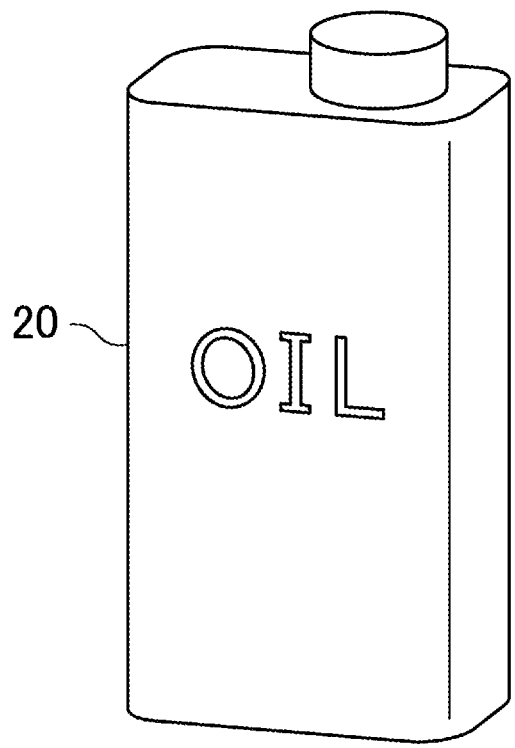
FIG. 4 is a perspective view illustrating a container according to the embodiment.

In the oil charging step, the supplementary refrigerating machine oil enclosed in a can (20) illustrated in FIG. 4 is charged into the refrigerant circuit (10). The can (20) has a size small enough for the operator who performs the refrigerant replacement method to handle the can (20) with his/her hand. The volume of the can (20) is, for example, 250 ml. The can (20) corresponds to a container.

The oil charging step will be described in detail with reference to FIG. 3.

In the oil charging step, the operator initially prepares an unopen can (20) containing the supplementary refrigerating machine oil. The operator connects the low pressure service port (16) to a hose (25). Next, the operator opens the can (20) containing the supplementary refrigerating machine oil, and inserts the hose (25) into the opened can (20).

Subsequently, the operator opens the low pressure service port (16). As described above, the internal pressure of the refrigerant circuit (10) is lower than the atmospheric pressure after the termination of the decompression step. Thus, the low pressure service port (16) opened allows the supplementary refrigerating machine oil in the can (20) to flow through the hose (25) and the low pressure service port (16) into the refrigerant circuit (10). When the supplementary refrigerating machine oil in the can (20) substantially totally enters the refrigerant circuit (10), the operator closes the low pressure service port (16). Thereafter, the operator detaches the hose (25) from the low pressure service port (16), and terminates the oil charging step.

In one preferred embodiment, the ratio (W2/W1) of the amount W2 of the refrigerating machine oil additionally charged into the refrigerant circuit (10) in the oil charging step to the amount W1 of the refrigerating machine oil in the refrigerant circuit (10) before the performance of the oil charging step is 15% or less. It is recommended that in this embodiment, the ratio (W2/W1) range from 8% to 15%. In this embodiment, the ratio (W2/W1) may range from 8% to 11%.

<Exhaust Step>

In the exhaust step, air or any other gas is exhausted out of the refrigerant circuit (10) after the termination of the oil charging step. The supplementary refrigerating machine oil charged into the refrigerant circuit (10) in the oil charging step contains air blended thereinto, and moisture. In the oil charging step, air may flow into the refrigerant circuit (10) together with the supplementary refrigerating machine oil. To address this problem, after the termination of the oil charging step and before the start of the refrigerant charging step, the exhaust step is performed.

The exhaust step will be described in detail with reference to FIG. 3.

In the exhaust step, the operator opens the high pressure service port (17) connected to the vacuum pump (30), and starts the vacuum pump (30). The vacuum pump (30) draws a gas, such as air or water vapor, present in the refrigerant circuit (10) thereinto, and exhausts the drawn gas out of the refrigerant circuit (10).

Meanwhile, the operator monitors the internal pressure of the refrigerant circuit (10) measured with a pressure gauge (not shown). If the internal pressure of the refrigerant circuit (10) is equal to or lower than a predetermined reference pressure (in this embodiment, −100 kPa), the operator closes the high pressure service port (17), and stops the vacuum pump (30). Thereafter, the operator detaches the vacuum pump (30) from the high pressure service port (17), and terminates the exhaust step.

<Refrigerant Charging Step>

In the refrigerant charging step, the refrigerant containing HFO is charged into the refrigerant circuit (10) of the refrigeration apparatus. The refrigerant charging step is performed according to a known mode.

Specifically, in the refrigerant charging step, the operator initially connects a cylinder (not shown) that contains the refrigerant containing HFO (the second refrigerant) to the high pressure service port (17). Thereafter, the operator opens the high pressure service port (17) to allow the refrigerant (the refrigerant containing HFO) contained in the cylinder to flow into the refrigerant circuit (10). When a predetermined amount of the refrigerant flows from the cylinder into the refrigerant circuit (10), the operator closes the high pressure service port (17). Thereafter, the operator detaches the cylinder from the high pressure service port (17), and terminates the refrigerant charging step.

Performing the foregoing steps allows the refrigerant in the refrigerant circuit (10) to be changed from the HFC refrigerant to the refrigerant containing HFO.

—Additive Content by Percentage of Refrigerating Machine Oil—

Here, the additive contents by percentage of the refrigerating machine oil before and after the performance of the refrigerant replacement method for the refrigeration apparatus will be described with reference to FIG. 5. This figure is a graph with horizontal and vertical axes. The horizontal axis represents transitions among the states of the refrigeration apparatus, and the vertical axis represents the additive content by percentage of the refrigerating machine oil observed when the refrigeration apparatus is in each of various states. This figure shows the additive content by percentage observed when the refrigeration apparatus is in an unoperated state (in other words, at the point in time when the HFC refrigerant is charged into the refrigerant circuit), the additive content by percentage observed when the refrigeration apparatus has been operated for a predetermined period, and the additive content by percentage observed after the performance of the refrigerant replacement method, in this order from the left of the graph.

Figure 5:
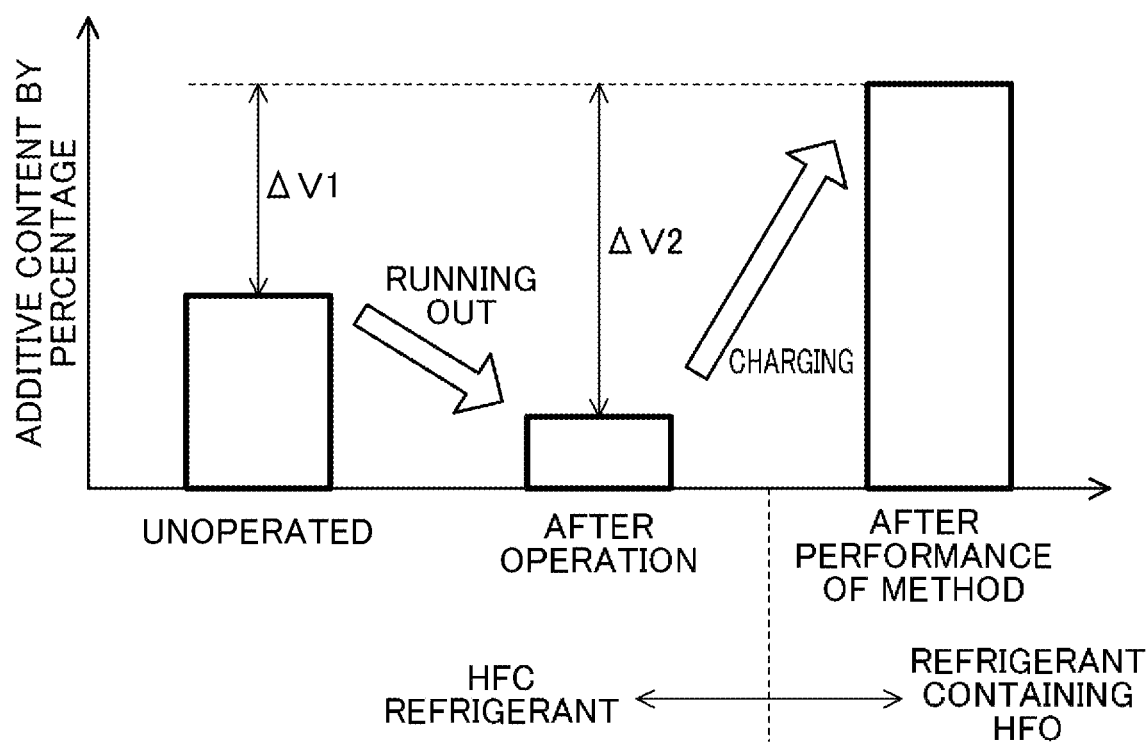
FIG. 5 is a graph for explaining the additive contents by percentage of a refrigerating machine oil before and after the performance of the refrigerant replacement method according to the embodiment.

As shown in FIG. 5, while the refrigeration apparatus is in the unoperated state, the additive content by percentage of the refrigerating machine oil is the additive content by percentage of the refrigerating machine oil to be used together with the HFC refrigerant. When the refrigeration apparatus has been operated for a predetermined period, the additive content by percentage of the refrigerating machine oil is lower than the additive content by percentage of the refrigerating machine oil observed when the refrigeration apparatus is in the unoperated state. This is because the operation of the refrigeration apparatus causes the additive in the refrigerating machine oil to run out. During the operation of the refrigeration apparatus, an acid scavenger is consumed, for example, to scavenge acid produced by decomposition of the refrigerant. After the performance of the refrigerant replacement method, the additive content by percentage of the refrigerating machine oil is the additive content by percentage of the refrigerating machine oil to be used together with the refrigerant containing HFO.

Here, attention is given not to the additive content by percentage of the refrigerating machine oil but to the additive content by amount of the refrigerating machine oil. The additive content by amount of the refrigerating machine oil in the refrigerant circuit (10) after the performance of the refrigerant replacement method (hereinafter referred to also as the "final content by amount") is higher than the additive content by amount of the refrigerating machine oil in the refrigerant circuit (10) observed when the refrigeration apparatus is in the unoperated state (hereinafter referred to also as the "initial content by amount"). The additive content by amount of the refrigerating machine oil in the refrigerant circuit (10) observed when the refrigeration apparatus is in the unoperated state is higher than the additive content by amount of the refrigerating machine oil in the refrigerant circuit (10) observed when the refrigeration apparatus has been operated for a predetermined period (hereinafter referred to as the "intermediate content by amount"). Thus, in one preferred embodiment, to achieve the final content by amount suitable for the refrigerant containing HFO in the oil charging step described above, the refrigerating machine oil having an additive content by amount equivalent to or higher than the difference between the final content by amount and the intermediate content by amount (defined as $\Delta V2$ in FIG. 5) is additionally charged into the refrigerant circuit (10). In one preferred embodiment, the additive content by amount of the refrigerating machine oil additionally charged in the oil charging step is higher than the difference between the final content by amount and the initial content by amount (defined as $\Delta V1$ in FIG. 5).

—Feature (1) of Embodiment—

The refrigerant replacement method for the refrigeration apparatus according to this embodiment is intended to replace the first refrigerant charged into the refrigerant circuit (10) of the refrigeration apparatus with the second refrigerant to be used together with the refrigerating machine oil having a higher additive content by percentage than the refrigerating machine oil used together with the first refrigerant. The refrigerant replacement method includes the refrigerant recovery step of recovering the first refrigerant from the refrigerant circuit (10), the oil charging step of additionally charging the refrigerating machine oil having a predetermined additive content by percentage into the refrigerant circuit (10), and the refrigerant charging step of charging the second refrigerant into the refrigerant circuit (10). The additive content by percentage of the refrigerating machine oil charged into the refrigerant circuit (10) in the oil charging step is higher than that of the refrigerating machine oil to be used together with the second refrigerant.

In the oil charging step of the refrigerant replacement method, the refrigerating machine oil having a predetermined additive content by percentage that is higher than the additive content by percentage of the refrigerating machine oil required by the second refrigerant is charged into the refrigerant circuit (10). Blending a refrigerating machine oil having such a high additive content by percentage with a refrigerating machine oil having an additive content by percentage suitable for the first refrigerant allows the refrigerant circuit (10) to be filled with a refrigerating machine oil having an additive content by percentage suitable for the second refrigerant. This refrigerant replacement method eliminates the need for detaching and attaching the compressor (11) from/to the refrigeration apparatus in course of replacement of the first refrigerant with the second refrigerant. This enables easy replacement of the refrigerant in the refrigeration apparatus.

—Feature (2) of Embodiment—

In the refrigerant replacement method for the refrigeration apparatus according to this embodiment, the additive content by amount of the refrigerating machine oil to be additionally charged in the oil charging step is greater than the difference between the additive content by amount of the refrigerating machine oil in the refrigerant circuit (10) after the performance of the oil charging step and the additive content by amount of the refrigerating machine oil in the refrigerant circuit (10) at the point in time when the first refrigerant has been charged into the refrigerant circuit (10).

Here, as the period of operation of the refrigeration apparatus increases, the additive content by amount of the refrigerating machine oil decreases. If no consideration is given to this amount of decrease in additive content, the additive content by amount of the refrigerating machine oil to be additionally charged in the oil charging step merely needs to be equivalent to the foregoing difference in the additive content by amount. However, the refrigeration apparatus that has actually been operated is short of the additives by the amount of decrease in additive content. To address this problem, in the refrigerant replacement method for the refrigeration apparatus according to this embodiment, the supplementary refrigerating machine oil to be additionally charged in the oil charging step can compensate for the entirety or a portion of the amount of decrease in additive content.

—Feature (3) of Embodiment—

In the refrigerant replacement method for the refrigeration apparatus according to this embodiment, the ratio of the amount of the refrigerating machine oil to be additionally charged into the refrigerant circuit (10) in the oil charging step to the amount of the refrigerating machine oil in the refrigerant circuit (10) before the performance of the oil charging step is 15% or less.

Reducing the amount of the refrigerating machine oil to be additionally charged as described above can restrain the amount of the refrigerating machine oil present in the refrigerant circuit (10) from increasing excessively after the termination of the oil charging step.

—Feature (4) of Embodiment—

The refrigerant replacement method for the refrigeration apparatus according to this embodiment includes the exhaust step of exhausting air out of the refrigerant circuit (10) during the performance of the oil charging step or after the termination of the oil charging step and before the start of the refrigerant charging step.

In the refrigerant replacement method for the refrigeration apparatus according to this embodiment, air, moisture, and any other substances that have entered the refrigerant circuit (10) in the oil charging step are discharged from the refrigerant circuit (10) in the exhaust step. Then, after air and water vapor are discharged from the refrigerant circuit (10) in the exhaust step, the refrigerant charging step is performed. This reduces the amount of air and water vapor remaining in the refrigerant circuit (10) after the termination of the refrigerant replacement method to a low level.

—Feature (5) of Embodiment—

In the exhaust step of the refrigerant replacement method according to this embodiment, air has been exhausted out of the refrigerant circuit (10) until the internal pressure of the refrigerant circuit (10) becomes equal to or lower than −100 kPa.

At the termination of the exhaust step, the internal pressure of the refrigerant circuit (10) becomes equal to or lower than −100 kPa. This reduces the amount of air and water vapor remaining in the refrigerant circuit (10) after the termination of the replacement of the refrigerant to an amount small enough to prevent practical problems. As a result, the refrigeration apparatus has adequately high reliability.

—Feature (6) of Embodiment—

In the oil charging step of the refrigerant replacement method according to this embodiment, the unopen can (20) containing the refrigerating machine oil to be charged into the refrigerant circuit (10) in the oil charging step is prepared. The prepared can (20) is opened, and the refrigerating machine oil in the can (20) is charged into the refrigerant circuit (10).

Here, when the can (20) for the refrigerating machine oil is opened, outside air enters the can (20). Storing the opened can (20) for a certain period may cause the refrigerating machine oil in the can (20) to deteriorate due to oxidation of the refrigerating machine oil or for any other reason.

To address this problem, in the oil charging step of this embodiment, the supplementary refrigerating machine oil contained in the can (20) opened for the first time in the oil charging step is charged into the refrigerant circuit (10). Thus, the quality of the supplementary refrigerating machine oil to be charged into the refrigerant circuit (10) in the oil charging step is maintained.

—Feature (7) of Embodiment—

In the oil charging step of the refrigerant replacement method of this embodiment, a total amount of the refrigerating machine oil contained in the opened can (20) is charged into the refrigerant circuit (10).

In the refrigerant replacement method of this embodiment, the amount of the supplementary refrigerating machine oil to be charged into the refrigerant circuit (10) in the oil charging step is kept constant. Thus, the amount of the additives to be resupplied to the refrigerant circuit (10) in the oil charging step is kept constant. As a result, a necessary amount of the additives can be reliably resupplied to the refrigerant circuit (10).

—Feature (8) of Embodiment—

The refrigerant replacement method for the refrigeration apparatus according to this embodiment includes the decompression step of exhausting air out of the refrigerant circuit (10) until the internal pressure of the refrigerant circuit (10) becomes lower than the atmospheric pressure, after the termination of the refrigerant recovery step and before the start of the oil charging step.

The refrigerant replacement method for the refrigeration apparatus according to this embodiment allows the internal pressure of the refrigerant circuit (10) to be lower than the atmospheric pressure at the point in time when the oil charging step is started. This enables easy flow of the refrigerating machine oil into the refrigerant circuit (10) in the oil charging step.

—Feature (9) of Embodiment—

In the refrigerant replacement method for the refrigeration apparatus according to this embodiment, the first refrigerant is an HFC refrigerant, and the second refrigerant is a refrigerant containing HFO. In this case, in the refrigeration apparatus, the HFC refrigerant can be easily replaced with the refrigerant containing HFO and having a lower global warming potential (GWP) than the HFC refrigerant. GWP is an abbreviation for the global warming potential.

—Feature (10) of Embodiment—

The refrigerating machine oil of this embodiment has a higher additive content by percentage than the refrigerating machine oil to be used together with the refrigerant containing HFO does. This refrigerating machine oil can be suitably used in the refrigerant replacement method for the refrigeration apparatus described above.

—Feature (11) of Embodiment—

The can (20) of this embodiment is the can (20) containing the refrigerating machine oil of this embodiment. If this can (20) is used to perform the refrigerant replacement method for the refrigeration apparatus according to this embodiment, the operator can easily perform the oil charging step. The use of this can (20) further facilitates performing the refrigerant replacement method for the refrigeration apparatus according to this embodiment.

OTHER EMBODIMENTS

The foregoing embodiment may also be configured as follows.

The first refrigerant is not limited to the HFC refrigerant. The first refrigerant may be a hydrochlorofluorocarbon (HCFC) refrigerant, such as R22, R123, or R124, or a chlorofluorocarbon (CFC) refrigerant, such as R11, R12, R13, R113, R114, R115, R500, or R502.

Examples of the HFO refrigerant corresponding to the second refrigerant include single-component refrigerants and refrigerant mixtures shown on the lists of FIGS. 6A, 6B, and 6C. The second refrigerant may be any optional refrigerant except the refrigerant containing HFO. However, in one preferred embodiment, the second refrigerant has a lower GWP than the first refrigerant does.

For example, the ratio of the amount of the refrigerating machine oil to be additionally charged in the oil charging step to the amount of the refrigerating machine oil in the refrigerant circuit (10) before the performance of the oil charging step may be greater than 15%.

For example, as long as the container accommodates the refrigerating machine oil, the container may be of any type different from the can (20), and does not need to be able to be handled by the operator's hand.

In the refrigerant replacement method of this embodiment, the oil charging step may be performed simultaneously and in parallel with the decompression step. In this case, while the gas in the refrigerant circuit (10) is discharged by the vacuum pump (30) connected to the high pressure service port (17), the supplementary refrigerating machine oil is introduced through the low pressure service port (16) into the refrigerant circuit (10).

In the refrigerant replacement method of this embodiment, the decompression step may be omitted. In this case, in the oil charging step, the supplementary refrigerating machine oil pressurized with a nitrogen gas or any other gas, for example, is introduced into the refrigerant circuit (10).

While the embodiments and a variation thereof have been described above, it will be understood that various changes in form and details may be made without departing from the spirit and scope of the claims. The foregoing embodiments and variations thereof may be combined and replaced with each other without deteriorating the intended functions of the present disclosure.

INDUSTRIAL APPLICABILITY

As can be seen from the foregoing description, the present disclosure is useful for a refrigerant replacement method for a refrigeration apparatus, a refrigerating machine oil, and a container.

EXPLANATION OF REFERENCES

10 Refrigerant Circuit
20 Can (Container)

The invention claimed is:

1. A refrigerant replacement method for a refrigeration apparatus, the method replacing a first refrigerant previously charged into a refrigerant circuit of the refrigeration apparatus with a second refrigerant, the first refrigerant being used together with a first refrigerating machine oil previously charged into the refrigerant circuit, the method comprising:
   a refrigerant recovery step of recovering the first refrigerant from the refrigerant circuit;
   an oil charging step of additionally charging a supplemental refrigerating machine oil having a predetermined additive content by percentage into the refrigerant circuit, the supplemental refrigerating machine oil blending with the first refrigerating machine oil to form a second refrigerating machine oil having a higher additive content by percentage than the first refrigerating machine oil; and a refrigerant charging step of charging the second refrigerant into the refrigerant circuit, the predetermined additive content by percentage of the supplemental refrigerating machine oil charged into the refrigerant circuit in the oil charging step being higher than the additive content by percentage of the second refrigerating machine oil to be used together with the second refrigerant.

2. The refrigerant replacement method of claim 1, wherein an additive content by amount of the supplemental refrigerating machine oil additionally charged into the refrigerant circuit in the oil charging step is greater than a difference between an additive content by amount of the second refrigerating machine oil in the refrigerant circuit after performance of the oil charging step and an additive content by amount of the first refrigerating machine oil in the refrigerant circuit at a point in time when the first refrigerant has been charged into the refrigerant circuit.

3. The refrigerant replacement method of claim 1, wherein a ratio of an amount of the supplemental refrigerating machine oil to be additionally charged into the refrigerant circuit in the oil charging step to an amount of the first refrigerating machine oil in the refrigerant circuit before performance of the oil charging step is 15% or less.

4. The refrigerant replacement method of claim 1, further comprising:

an exhaust step of exhausting air out of the refrigerant circuit during performance of the oil charging step or during a period after termination of the oil charging step and before start of the refrigerant charging step.

5. The refrigerant replacement method of claim 4, wherein in the exhaust step, air is exhausted out of the refrigerant circuit until an internal pressure of the refrigerant circuit becomes equal to or lower than −100 kPa.

6. The refrigerant replacement method of claim 1, wherein in the oil charging step, an unopen container containing the supplemental refrigerating machine oil to be charged into the refrigerant circuit in the oil charging step is opened to allow the supplemental refrigerating machine oil in the container to be charged into the refrigerant circuit.

7. The refrigerant replacement method of claim 6, wherein in the oil charging step, a total amount of the supplemental refrigerating machine oil contained in the opened container is charged into the refrigerant circuit.

8. The refrigerant replacement method of claim 1, further comprising:

a decompression step of exhausting air out of the refrigerant circuit until an internal pressure of the refrigerant circuit becomes lower than an atmospheric pressure, after termination of the refrigerant recovery step and before start of the oil charging step.

9. The refrigerant replacement method of claim 1, wherein the first refrigerant is an HFC refrigerant, and the second refrigerant is a refrigerant containing HFO.

* * * * *